(12) United States Patent
Yasuoka et al.

(10) Patent No.: US 7,514,178 B2
(45) Date of Patent: Apr. 7, 2009

(54) HYDROGEN-ABSORBING ALLOY FOR ALKALINE STORAGE BATTERY, METHOD OF MANUFACTURING THE SAME, AND ALKALINE STORAGE BATTERY

(75) Inventors: Shigekazu Yasuoka, Kobe (JP); Tetsuyuki Murata, Kobe (JP); Jun Ishida, Kobe (JP)

(73) Assignee: SANYO Electric Co., Ltd., Osaka (JP)

( * ) Notice: Subject to any disclaimer, the term of this patent is extended or adjusted under 35 U.S.C. 154(b) by 670 days.

(21) Appl. No.: 11/041,678

(22) Filed: Jan. 25, 2005

(65) Prior Publication Data

US 2005/0164083 A1 Jul. 28, 2005

(30) Foreign Application Priority Data

Jan. 26, 2004 (JP) ............... 2004-016553

(51) Int. Cl.
*H01M 4/58* (2006.01)
*C22C 19/03* (2006.01)

(52) U.S. Cl. ............ 429/218.2; 420/455; 420/460

(58) Field of Classification Search ............. None
See application file for complete search history.

(56) References Cited

U.S. PATENT DOCUMENTS 6,248,475 B1 * 6/2001 Hayashida et al. ...... 429/218.2

2003/0096164 A1 5/2003 Sakai et al. ........... 429/206

FOREIGN PATENT DOCUMENTS

JP 11-323469 A 11/1999
JP 2002-105563 A 4/2002

OTHER PUBLICATIONS

Cullity, B.D., Elements of X-Ray Diffraction, 1978, Addison-Wesley Publishing Company, second edition, pp. 126-127.*

* cited by examiner

*Primary Examiner*—Dah-Wei D Yuan
*Assistant Examiner*—Maria J Laios
(74) *Attorney, Agent, or Firm*—Kubovcik & Kubovcik

(57) ABSTRACT

An alkaline storage battery including a positive electrode (1), a negative electrode (2) using a hydrogen-absorbing alloy, and an alkaline electrolyte solution employs, as the hydrogen-absorbing alloy in the negative electrode, a hydrogen-absorbing alloy for alkaline storage batteries including at least a rare-earth element, magnesium, nickel, and aluminum, and having an intensity ratio $I_A/I_B$ of 1.00 or greater, wherein $I_A$ is the strongest peak intensity appearing in the range $2\theta=32°-33°$ and $I_B$ is the strongest peak intensity appearing in the range $2\theta=35°-36°$ in an X-ray diffraction analysis using Cu-K$\alpha$ radiation as the X-ray source.

6 Claims, 2 Drawing Sheets

HYDROGEN-ABSORBING ALLOY FOR ALKALINE STORAGE BATTERY, METHOD OF MANUFACTURING THE SAME, AND ALKALINE STORAGE BATTERY

BACKGROUND OF THE INVENTION

1. Field of the Invention

This invention relates to hydrogen-absorbing alloys for alkaline storage batteries, which are used for negative electrodes of the alkaline storage batteries, methods of manufacturing the same, and alkaline storage batteries. More particularly, a feature of the invention is to improve a hydrogen-absorbing alloy for alkaline storage batteries using a hydrogen-absorbing alloy containing at least a rare-earth element, magnesium, nickel, and aluminum to increase capacity of the alkaline storage batteries, and to lessen the degradation of the hydrogen-absorbing alloy originating from charge-discharge cycles so that cycle life of the alkaline storage batteries can be improved.

2. Description of Related Art

Conventionally, nickel-cadmium storage batteries have been commonly used as alkaline storage batteries. In recent years, nickel-metal hydride storage batteries using a hydrogen-absorbing alloy for their negative electrode have drawn considerable attention from viewpoints that they have a higher capacity than nickel-cadmium storage batteries and, being free of cadmium, they are more environmentally safe.

As the nickel-metal hydride storage batteries have been increasingly used in various portable devices, further higher performance in the nickel-metal hydride storage batteries has been demanded.

In the nickel-metal hydride storage batteries, hydrogen-absorbing alloys such as a rare earth-nickel hydrogen-absorbing alloy having a $CaCu_5$ crystal structure as its main phase and a Laves phase hydrogen-absorbing alloy containing Ti, Zr, V and Ni have been generally used for their negative electrodes.

However, these hydrogen-absorbing alloys generally do not necessarily have sufficient hydrogen-absorbing capability, and it has been difficult to further increase the capacity of the nickel-metal hydride storage batteries.

In recent years, in order to improve the hydrogen-absorbing capability of the rare earth-nickel hydrogen-absorbing alloy, it has been proposed to use a hydrogen-absorbing alloy having a $Ce_2Ni_7$ type or a $CeNi_3$ type crystal structure, other than the $CaCu_5$ type, by adding Mg or the like to the rare earth-nickel hydrogen-absorbing alloy. (See, for example, Japanese Unexamined Patent Publication No. 11-323469.)

Nevertheless, a problem in using the above-described hydrogen-absorbing alloy for a negative electrode of an alkaline storage battery has been that repeated charge-discharge cycles cause the hydrogen-absorbing alloy to deteriorate, reducing the cycle life of the alkaline storage battery.

An object of the invention is to resolve the foregoing and other problems in alkaline storage batteries using, for their negative electrodes, a hydrogen-absorbing alloy for alkaline storage batteries in which Mg or the like is added to a rare earth-nickel hydrogen-absorbing alloy to form a crystal structure other than the $CaCu_5$ type, and specifically, an object of the invention is to suppress degradation of the hydrogen-absorbing alloy used for the negative electrodes when repeatedly charging and discharging the alkaline storage batteries, improving cycle life of the alkaline storage batteries.

BRIEF SUMMARY OF THE INVENTION

In order to resolve the foregoing and other problems, the present invention provides a hydrogen-absorbing alloy for alkaline storage batteries, comprising at least a rare-earth element, magnesium, nickel, and aluminum, wherein an intensity ratio $I_A/I_B$ of a strongest peak intensity $I_A$ that appears in the range of $2\theta=32°-33°$ to a strongest peak intensity $I_B$ that appears in the range of $2\theta=35°-36°$ is 1.00 or greater in X-ray diffraction analysis using Cu—Kα radiation as the X-ray source.

The above-described hydrogen-absorbing alloy for alkaline storage batteries may be manufactured by annealing a hydrogen-absorbing alloy comprising at least a rare-earth element, magnesium, nickel, and aluminum at a temperature that is 40° C. to 80° C. lower than a melting point of the hydrogen-absorbing alloy.

The hydrogen-absorbing alloy comprising at least a rare-earth element, magnesium, nickel, and aluminum is non-uniform and separated into a phase with more Mg and a phase with less Mg at the initial stage of production. However, it is believed that by annealing the hydrogen-absorbing alloy at a temperature that is 40° C.-80° C. lower than its melting point, the texture that was separated into the phase with more Mg and the phase with less Mg is made uniform, and the intensity ratio $I_A/I_B$ accordingly increases to 1.00 or greater. In particular, annealing the hydrogen-absorbing alloy at a temperature 40° C.-70° C. lower than the melting point makes the texture more uniform and increases the intensity ratio $I_A/I_B$ to 1.15 or greater.

The hydrogen-absorbing alloy for alkaline storage batteries as described above may be manufactured by controlling the compositions of the hydrogen-absorbing alloy or the conditions in melting or cooling it when obtaining the hydrogen-absorbing alloy, other than by annealing a hydrogen-absorbing alloy in the manner as described above.

Herein, any hydrogen-absorbing alloy may be used as long as the hydrogen-absorbing alloy contains at least a rare-earth element, magnesium, nickel, and aluminum, as described above. Nevertheless, in order to increase the battery capacity and also improve the cycle life, it is preferable to use, for example, a hydrogen-absorbing alloy represented by the general formula $Ln_{1-x}Mg_xNi_{y-a}Al_a$, where Ln is at least one element selected from rare-earth elements, and x, y, and a satisfy $0.15 \leq x \leq 0.25$, $3.0 \leq y \leq 3.6$, and $0 < a \leq 0.3$. It is preferable to use a hydrogen-absorbing alloy in which a portion of the rare-earth element Ln or the Ni in the hydrogen-absorbing alloy represented by the above-noted general formula is substituted by at least one element selected from the group consisting of V, Nb, Ta, Cr, Mo, Mn, Fe, Co, Ga, Zn, Sn, In, Cu, Si, P. and B.

As described above, in this invention, an alkaline storage battery comprising a positive electrode, a negative electrode using a hydrogen-absorbing alloy, and an alkaline electrolyte solution employs, as the hydrogen-absorbing alloy in the negative electrode, a hydrogen-absorbing alloy for alkaline storage batteries comprising at least a rare-earth element, magnesium, nickel, and aluminum, wherein the intensity ratio $I_A/I_B$ of the strongest peak intensity $I_A$ that appears in the range of $2\theta=32°-33°$ to the strongest peak intensity $I_B$ that appears in the range of $2\theta=35°-36°$ is 1.00 or greater in X-ray diffraction analysis using Cu—Kα radiation as the X-ray source. Therefore, the hydrogen-absorbing capability of the hydrogen-absorbing alloy for alkaline storage batteries is high, and the capacity of the alkaline storage battery increases.

Moreover, in the hydrogen-absorbing alloy for alkaline storage batteries, its texture is made uniform as described above, and therefore, the hydrogen-absorbing alloy for alkaline storage batteries is prevented from deteriorating even if charge-discharge cycles are performed repeatedly, improving the cycle life of the alkaline storage battery.

DETAILED DESCRIPTION OF THE PREFERRED EMBODIMENTS

Figure 1:
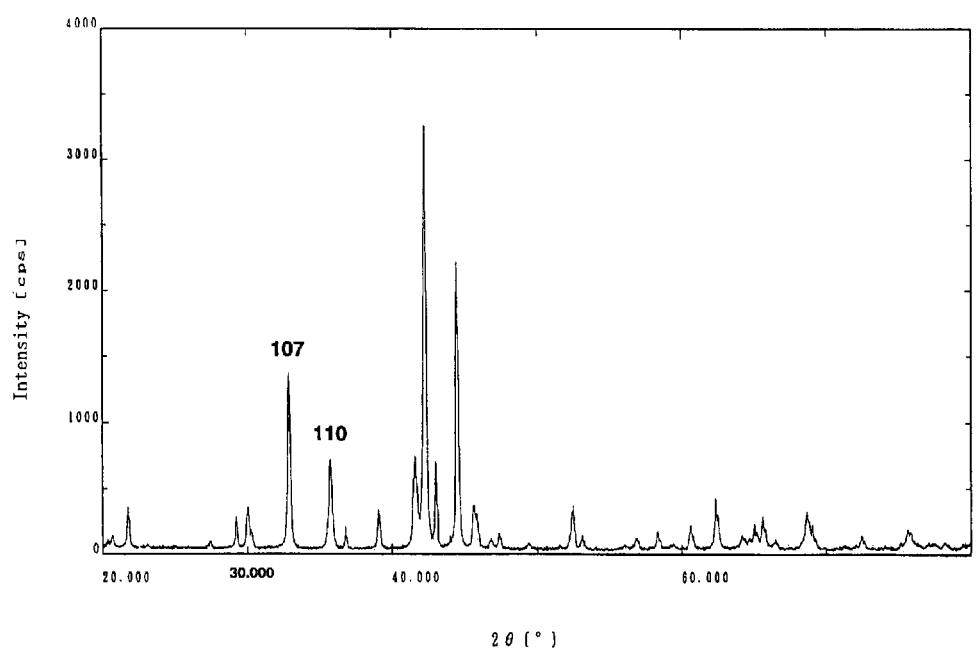
FIG. 1 illustrates the results of an X-ray diffraction analysis of a hydrogen-absorbing alloy that has been annealed at 990° C. as in Example 4 of the invention.

Hereinbelow, examples of the hydrogen-absorbing alloys for alkaline storage batteries, methods of manufacturing the same, and the alkaline storage battery according to the invention are specifically described. Comparative examples are also shown to demonstrate that degradation of the hydrogen-absorbing alloy used for the negative electrode of alkaline storage batteries is suppressed and their cycle life improved in the alkaline storage batteries of the examples according to the invention. It should be understood, however, that the hydrogen-absorbing alloy for alkaline storage batteries, the method of manufacturing the same, and the alkaline storage battery according to the invention are not limited to those illustrated in the following examples, and various changes and modifications may be made without departing from the scope of the invention.

EXAMPLES 1 TO 5 AND COMPARATIVE EXAMPLES 1 TO 3

In Examples 1 to 5 and Comparative Examples 1 to 3, Mg, Ni, and Al as well as rare-earth elements La, Pr, and Nd were used to prepare a hydrogen-absorbing alloy for alkaline storage batteries, which was used for negative electrodes. The materials were mixed together to produce a predetermined alloy composition, and the mixture was then melted at 1500° C. by an induction furnace and then cooled. Thus, hydrogen-absorbing alloy ingots each containing the rare-earth elements, magnesium, nickel, and aluminum were prepared.

The composition of the hydrogen-absorbing alloy was analyzed by ICP (inductively-coupled plasma optical emission spectroscopy). As a result, the composition of the hydrogen-absorbing alloy was found to be $(La_{0.2}Pr_{0.4}Nd_{0.4})_{0.83}Mg_{0.17}Ni_{3.13}Al_{0.17}$. The melting point Tm of this hydrogen-absorbing alloy was found to be 1040° C. with DSC (differential scanning calorimeter).

In Examples 1 to 5 and Comparative Examples 2 and 3, the hydrogen-absorbing alloy ingots thus prepared were annealed for 10 hours in an argon atmosphere. As set out in Table 1 below, annealing temperatures T in the annealing for Examples 1 through 6 were set at 960° C., 970° C., 980° C., 990° C., and 1000° C., respectively, which were within the temperature range that was 40° C.-80° C. lower than the melting point Tm; on the other hand, the temperatures in the annealing for Comparative Examples 2 and 3 were respectively set at 940° C. and 1010° C., which were respectively 100° C. and 30° C. lower than the melting point Tm.

Next, the hydrogen-absorbing alloy ingots that were annealed in the manner as illustrated in Examples 1 to 5 and Comparative Examples 2 and 3, and the hydrogen-absorbing alloy ingot of Comparative Example 1, which was not annealed, were mechanically pulverized in an inert atmosphere to obtain powders of the respective hydrogen-absorbing alloys. The particle size distribution of the powders of the hydrogen-absorbing alloys was measured using a laser diffraction/scattering particle size analyzer. The weight-average particle size of the hydrogen-absorbing alloy powders was found to be 65 μm.

Using an X-ray diffraction analyzer that employs a Cu—Kα tube as an X-ray source, the foregoing hydrogen-absorbing alloy powders were subjected to X-ray diffraction analysis with a scan speed of 1°/min., a tube voltage of 40 kV, a tube current of 40 mA, and a scan step of 0.02°.

The measurement result of the hydrogen-absorbing alloy powder that was annealed at 990° C., as in the above-described Example 4, is shown in FIG. 1. The result of the X-ray diffraction analysis indicates that the peak positions of this hydrogen-absorbing alloy matched those of hydrogen-absorbing alloy having a $Ce_2Ni_7$ type crystal structure. Thus, it is believed that this hydrogen-absorbing alloy has the $Ce_2Ni_7$ type or similar crystal structure.

Moreover, the strongest peak intensity ($I_A$) appearing in the range 2θ=32°-33°, which corresponds to the (107) plane of the $Ce_2Ni_7$ type crystal structure, and the strongest peak intensity ($I_B$) appearing in the range 2θ=35°-36°, which corresponds to the (110) plane of the $Ce_2Ni_7$ type crystal structure, were measured for each of the hydrogen-absorbing alloy powders to obtain intensity ratios ($I_A/I_B$). The results are tabulated in Table 1 below.

The results demonstrate that the hydrogen-absorbing alloys that were annealed in the manner as shown in Examples 1 to 5 and Comparative Examples 2 and 3, showed higher intensity ratios ($I_A/I_B$) than the hydrogen-absorbing alloy of Comparative Example 1, which was not annealed, and the hydrogen-absorbing alloys that were annealed at a temperature in the range of 960° C.-1000° C., at a temperature 40° C.-80° C. lower than its melting point Tm, as in Examples 1 to 5, showed high intensity ratios ($I_A/I_B$) of 1.00 or greater. In particular, the hydrogen-absorbing alloys of Examples 2 to 5, which were annealed at a temperature in the range of 970° C.-1000° C., at a temperature 40° C.-70° C. lower than the melting point Tm, showed even higher intensity ratios ($I_A/I_B$) of 1.15 or greater. Among them, the hydrogen-absorbing alloy of Example 4, which was annealed at 990° C., at a temperature 50° C. lower than the melting point Tm, showed the greatest intensity ratio ($I_A/I_B$).

Next, using each of the hydrogen-absorbing alloy powders treated according to Examples 1 to 5 and Comparative Examples 2 and 3, 100 parts by weight of hydrogen-absorbing alloy powder, 0.4 parts by weight of sodium polyacrylic acid, 0.1 parts by weight of carboxymethylcellulose, and 2.5 parts by weight of a polytetrafluoroethylene dispersion solution in which 60 wt. % of polytetrafluoroethylene is dispersed in water were mixed to prepare a paste. The paste thus prepared was applied uniformly onto both sides of a conductive core made of 60 μm-thick punched metal that was plated with nickel, then dried, and pressed. Thereafter, the metal plate was cut into predetermined dimensions. Thus, negative electrodes using the above-described hydrogen-absorbing alloy powders were prepared.

To prepare positive electrodes, nickel hydroxide powder containing 2.5 weight % of zinc and 1.0 weight % of cobalt was put into an aqueous solution of cobalt sulfate, and 1 mole of aqueous solution of sodium hydroxide was gradually dropped into the mixture with stirring to cause the components to react with each other until the pH became 11. Thereafter, the resultant precipitate was filtered, washed with water, and vacuum dried. Thus, nickel hydroxide coated with cobalt hydroxide on its surface was obtained.

Then, a 25 weight % aqueous solution of sodium hydroxide was added and impregnated into the nickel hydroxide coated with cobalt hydroxide at a weight ratio of 1:10, and the resultant was annealed at 85° C. for 8 hours with stirring. Thereafter, this was rinsed with water and dried to obtain a positive electrode material in which the surface of the nickel hydroxide was coated with sodium-containing cobalt oxide.

150 mA for 16 hours and then discharged to a battery voltage of 1.0 V at a current of 1500 mA. The charging and discharging were repeated three times to activate the alkaline storage batteries.

Next, the alkaline storage batteries of Examples 1 to 5 and Comparative Examples 2 and 3 thus activated were charged to the maximum battery voltage at a current of 1500 mA, then kept charged until the battery voltage decreased by 10 mV, and thereafter discharged to a battery voltage of 1.0 V at a current of 1500 mA. This charge-discharge cycle was carried out repeatedly, and the number of cycles at which the discharge capacity of each battery reduced to 80% of that of cycle 1 was obtained as the cycle life for each battery. The results are tabulated in Table 1 below.

TABLE 1

| | Composition of hydrogen-absorbing alloy | T (° C.) | Tm − T (° C.) | $I_A/I_B$ | Cycle life (cycles) |
|---|---|---|---|---|---|
| Ex. 1 | $(La_{0.2}Pr_{0.4}Nb_{0.4})_{0.83}Mg_{0.17}Ni_{3.13}Al_{0.17}$ | 960 | 80 | 1.00 | 322 |
| Ex. 2 | $(La_{0.2}Pr_{0.4}Nb_{0.4})_{0.83}Mg_{0.17}Ni_{3.13}Al_{0.17}$ | 970 | 70 | 1.15 | 346 |
| Ex. 3 | $(La_{0.2}Pr_{0.4}Nb_{0.4})_{0.83}Mg_{0.17}Ni_{3.13}Al_{0.17}$ | 980 | 60 | 1.17 | 365 |
| Ex. 4 | $(La_{0.2}Pr_{0.4}Nb_{0.4})_{0.83}Mg_{0.17}Ni_{3.13}Al_{0.17}$ | 990 | 50 | 1.98 | 360 |
| Ex. 5 | $(La_{0.2}Pr_{0.4}Nb_{0.4})_{0.83}Mg_{0.17}Ni_{3.13}Al_{0.17}$ | 1000 | 40 | 1.36 | 346 |
| Comp. Ex. 1 | $(La_{0.2}Pr_{0.4}Nb_{0.4})_{0.83}Mg_{0.17}Ni_{3.13}Al_{0.17}$ | — | — | 0.82 | — |
| Comp. Ex. 2 | $(La_{0.2}Pr_{0.4}Nb_{0.4})_{0.83}Mg_{0.17}Ni_{3.13}Al_{0.17}$ | 940 | 100 | 0.86 | 284 |
| Comp. Ex. 3 | $(La_{0.2}Pr_{0.4}Nb_{0.4})_{0.83}Mg_{0.17}Ni_{3.13}Al_{0.17}$ | 1010 | 30 | 0.95 | 308 |

Then, 95 parts by weight of the positive electrode material thus prepared, 3 parts by weight of zinc oxide, and 2 parts by weight of cobalt hydroxide were mixed, and to the mixture, 50 parts by weight of an aqueous solution of 0.2 weight % hydroxypropylcellulose was added and mixed together to prepare a slurry. The slurry was filled into a nickel foam having a weight per unit area of 600 g/m², and the resultant was dried and pressed, and thereafter cut into predetermined dimensions. Thus, positive electrodes each composed of a non-sintered nickel electrode were prepared.

A nonwoven fabric made of polypropylene was used as a separator. An alkaline electrolyte solution containing KOH, NaOH, and LiOH—H$_2$O at a weight ratio of 8:0.5:1 in a total quantity of 30 weight % was used as an alkaline electrolyte solution.

Figure 2:
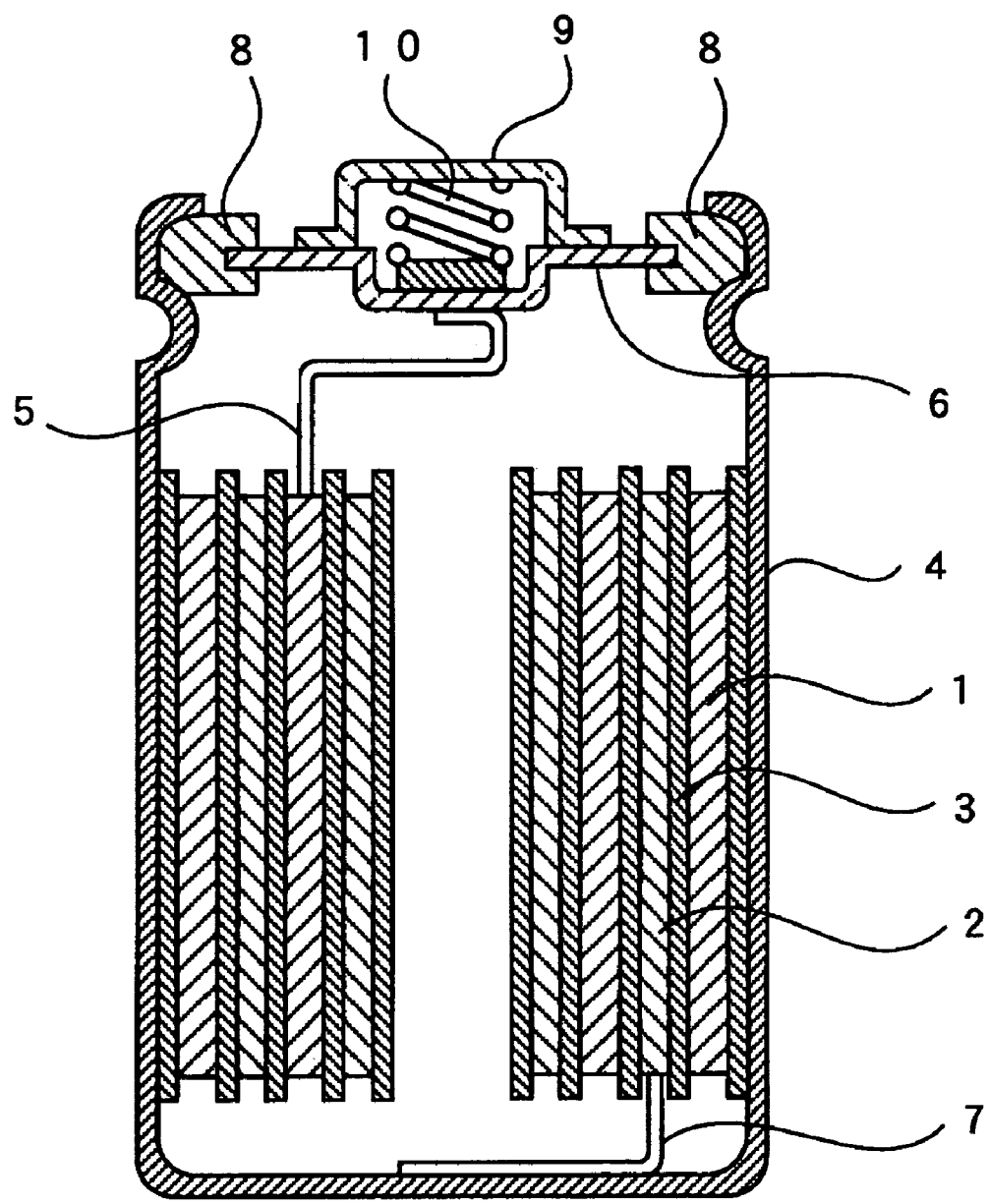
FIG. 2 is a schematic cross-sectional view of an alkaline storage battery fabricated according to Examples 1 to 6 and Comparative Examples 2 and 3.

Then, using these components and the above-described negative electrodes, alkaline storage batteries of Examples 1 to 5 and Comparative Examples 2 and 3 were assembled, which had a design capacity of 1500 mAh and a cylindrical shape as shown in FIG. 2.

To prepare each of the alkaline storage batteries, as illustrated in FIG. 2, a positive electrode 1, a negative electrode 2, and a separator 3 interposed therebetween were spirally coiled and accommodated in a battery can 4. The alkaline electrolyte solution was poured into the battery can 4, and thereafter, an insulative packing 8 was placed between the battery can 4 and a positive electrode cap 6 to seal the battery can 4. The positive electrode 1 was connected to the positive electrode cap 6 through a positive electrode lead 5, and the negative electrode 2 was connected to the battery can 4 through a negative electrode lead 7. The battery can 4 and the positive electrode cap 6 were electrically insulated by the insulative packing 8. A coil spring 10 was placed between the positive electrode cap 6 and a positive electrode external terminal 9. The coil spring 10 is compressed to release gas from the interior of the battery to the atmosphere when the internal pressure of the battery unusually increases.

The alkaline storage batteries of Examples 1 to 5 and Comparative Examples 2 and 3 were charged at a current of The results demonstrate that the alkaline storage batteries of Examples 1 to 5, which used the hydrogen-absorbing alloys having intensity ratios ($I_A/I_B$) of 1.00 or greater, showed improved cycle life over the alkaline storage batteries of Comparative Examples 2 and 3, which used the hydrogen-absorbing alloys having intensity ratios ($I_A/I_B$) of less than 1.00. Moreover, the storage batteries of Examples 2 to 5, which used the hydrogen-absorbing alloys with intensity ratios ($I_A/I_B$) of 1.15 or greater, showed further improved cycle life.

EXAMPLE 6

In Example 6, a hydrogen-absorbing alloy ingot containing rare-earth elements, magnesium, nickel, and aluminum was prepared in the same manner as in the foregoing Examples except that, in preparing the hydrogen-absorbing alloy for alkaline storage batteries to be used for the negative electrode, the proportions of Ni and Al to be mixed in were varied from those in the foregoing Examples. The composition of the hydrogen-absorbing alloy was analyzed by ICP (inductively-coupled plasma optical emission spectroscopy). The composition of the hydrogen-absorbing alloy was found to be $(La_{0.2}Pr_{0.4}Nd_{0.4})_{0.83}Mg_{0.17}Ni_{3.1}Al_{0.2}$, and the melting point Tm thereof measured with DSC (differential scanning calorimeter) was 1030° C.

In Example 6, the above-described hydrogen-absorbing alloy ingot was annealed for 10 hours in an argon atmosphere at a temperature of 980° C., which is 50° C. lower than the melting point Tm, and thereafter mechanically pulverized in an inert atmosphere in the same manner as in the foregoing to obtain a hydrogen-absorbing alloy powder.

The intensity ratio ($I_A/I_B$) of the hydrogen-absorbing alloy powder, obtained in the same manner as in the foregoing, was found to be 1.54, as shown in Table 2 below.

An alkaline storage battery of Example 6 was assembled in the same manner as in the foregoing except that the thus-prepared hydrogen-absorbing alloy powder was used.

Next, the alkaline storage batteries of Examples 5 and 6 were activated in the same manner as in the foregoing Examples. Thereafter, the batteries were charged to the maximum battery voltage at a current of 1500 mA, kept charged until the battery voltage decreased by 10 mV, and thereafter discharged to a battery voltage of 1.0 V at a current of 1500 mA. This charging and discharging cycle was repeated 400 times.

The alkaline storage batteries of Examples 5 and 6 were disassembled after cycle 400 to obtain the hydrogen-absorbing alloys in the respective negative electrodes. The intensity ratio ($I_A/I_B$) of each of the hydrogen-absorbing alloys was measured in the same manner as in the foregoing. The results are tabulated in Table 2 below.

TABLE 2

| Composition of hydrogen-absorbing alloy | $I_A/I_B$ | |
|---|---|---|
| | Initial stage | After cycle 400 |
| Ex. 5 $(La_{0.2}Pr_{0.4}Nb_{0.4})_{0.83}Mg_{0.17}Ni_{3.13}Al_{0.17}$ | 1.98 | 1.13 |
| Ex. 6 $(La_{0.2}Pr_{0.4}Nb_{0.4})_{0.83}Mg_{0.17}Ni_{3.1}Al_{0.2}$ | 1.94 | 0.80 |

The results demonstrate that both the alkaline storage batteries of Examples 5 and 6 showed a considerable decrease in the intensity ratio ($I_A/I_B$) after cycle 400, in comparison with that at the initial stage. This is believed to be because the degree of uniformity in the texture of the hydrogen-absorbing alloy deteriorated due to the charge-discharge cycles.

It is therefore believed that when the intensity ratio ($I_A/I_B$) is low at the initial stage, the degree of uniformity in the texture of the hydrogen-absorbing alloy deteriorates rapidly, reducing the cycle life of the alkaline storage battery. Accordingly, it is preferable that a hydrogen-absorbing alloy that has a large intensity ratio ($I_A/I_B$) at the initial stage be used in order to improve the cycle life of the alkaline storage battery.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

This application claims priority of Japanese Patent Application No. 2004-016553, filed Jan. 26, 2004, which is incorporated herein by reference.

What is claimed is:

1. A hydrogen-absorbing alloy for alkaline storage batteries having the formula $Ln_{1-x}Mq_xNi_{y-a}Al_a$, where Ln is at least one element selected from rare-earth elements, and x, y, and a satisfy $0.15 \leq x \leq 0.25$, $3.0 \leq y \leq 3.6$, and $0 < a \leq 0.3$, wherein an intensity ratio $I_A/I_B$ of the alloy, where $I_A$ is a strongest peak intensity that appears in the range of $2\theta=32°$-$33°$ and $I_B$ is a strongest peak intensity that appears in the range of $2\theta=35°$-$36°$ in X-ray diffraction analysis using Cu—K$\alpha$ radiation as an X-ray source, is 1.00 or greater.

2. The hydrogen-absorbing alloy for alkaline storage batteries according to claim 1, wherein the intensity ratio $I_A/I_B$ of the hydrogen-absorbing alloy is 1.15 or greater.

3. A method of manufacturing a hydrogen-absorbing alloy for alkaline storage batteries, comprising, in manufacturing the hydrogen-absorbing alloy according to claim 1, annealing a hydrogen-absorbing alloy of said formula at a temperature 40° C. to 80° C. lower than a melting point of the hydrogen-absorbing alloy.

4. A method of manufacturing a hydrogen-absorbing alloy for alkaline storage batteries, comprising, in manufacturing the hydrogen-absorbing alloy according to claim 2, annealing a hydrogen-absorbing alloy of said formula at a temperature 40° C. to 80° C. lower than a melting point of the hydrogen-absorbing alloy.

5. An alkaline storage battery comprising: a positive electrode, a negative electrode using a hydrogen-absorbing alloy, and an alkaline electrolyte solution, said hydrogen-absorbing alloy being a hydrogen-absorbing alloy for alkaline storage batteries according to claim 1.

6. An alkaline storage battery comprising: a positive electrode, a negative electrode using a hydrogen-absorbing alloy, and an alkaline electrolyte solution, said hydrogen-absorbing alloy being a hydrogen-absorbing alloy for alkaline storage batteries according to claim 2.

* * * * *